Sept. 15, 1970    J. W. GEARING    3,529,188

ELECTRO-MAGNETIC VIBRATOR SUSPENSION

Filed Sept. 29, 1967    5 Sheets-Sheet 1

INVENTOR
JAMES W. GEARING
BY
Watson, Cole, Grindle+Watson
ATTORNEYS

Sept. 15, 1970   J. W. GEARING   3,529,188
ELECTRO-MAGNETIC VIBRATOR SUSPENSION
Filed Sept. 29, 1967   5 Sheets-Sheet 3

INVENTOR
JAMES W. GEARING
BY
Watson, Cole, Grindle + Watson
ATTORNEYS

Sept. 15, 1970   J. W. GEARING   3,529,188
ELECTRO-MAGNETIC VIBRATOR SUSPENSION

Filed Sept. 29, 1967   5 Sheets-Sheet 5

INVENTOR
JAMES W. GEARING
BY
Watson, Cole, Grindle + Watson
ATTORNEYS

United States Patent Office 3,529,188
Patented Sept. 15, 1970

3,529,188
ELECTRO-MAGNETIC VIBRATOR SUSPENSION
James Walter Gearing, Sussex, England, assignor to Derritron Electronic Vibrators Limited, Sussex, England, a company of Great Britain
Filed Sept. 29, 1967, Ser. No. 671,854
Claims priority, application Great Britain, Sept. 29, 1966, 43,613/66
Int. Cl. H02k 35/04
U.S. Cl. 310—27                                                10 Claims

ABSTRACT OF THE DISCLOSURE

In an electromagnetic vibrator the moving coil and output member are connected to the fixed structure for vibratory movement along the axis, by means of two sets of radial beams each having at one or both ends a coupling of the type comprising a cylindrical or part-spherical rubber bush with its axis tangential in relation to that of the vibrator. To facilitate access both sets of beams may be above the magnetic circuit.

---

Figure 1:
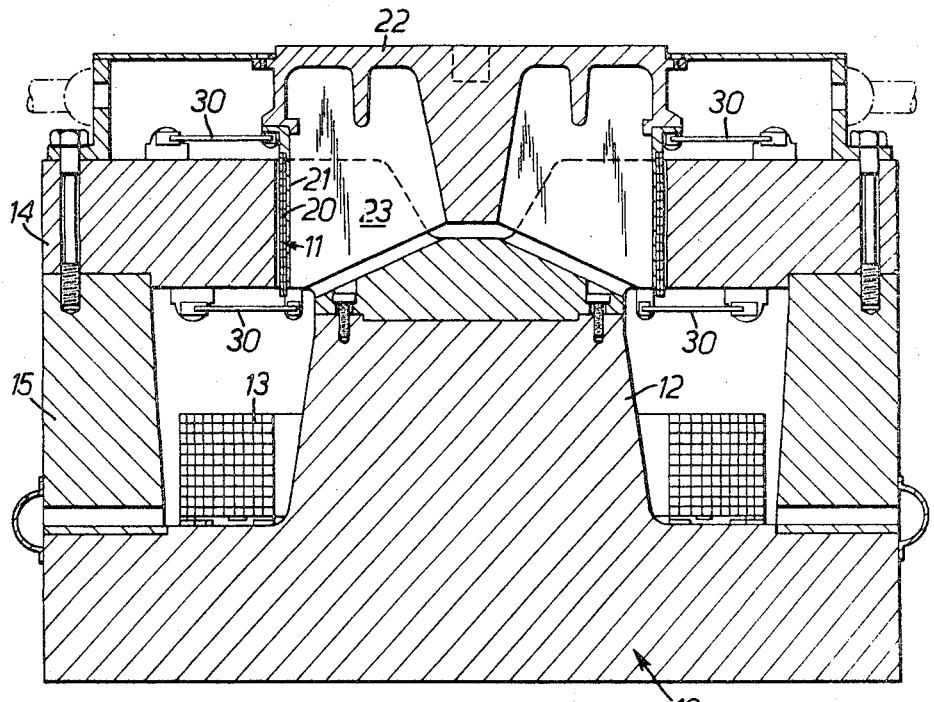

This invention relates to electro-magnetic vibrators comprising two parts subjected to relative vibratory movement along an axis. Thus in the case of a moving coil magnetic vibrator one part would normally include a pot magnet having an inner pole piece surrounded by an annular outer pole piece affording between them an annular air gap, while the other part would include a moving coil situated in the air gap and provided with means for electrically connecting it to an alternating supply and carried by a tubulator support mechanically connected to an output member supported so as to be capable of axial vibration with the coil.

The present invention is concerned with the problem of connecting the two parts together, that is to say, suspending the moveing part in relation to the fixed part. In use, the moving part may have to move a considerable distance axially, for example half an inch or more in each direction from a mean position, while being guided so as to restrict lateral movement to a minimum.

According to the present invention the parts are connected together by beams each extending generally radially from one part to the other, and each beam is connected to one of the parts by means of a resilient coupling which includes inner and outer rigid members, and, interposed between them, a bush of rubber or like resilient material in the form of a surface of revolution about the axis of the coupling, the coupling being mounted with its axis extending substantially perpendicular with respect to the vibration axis of the coil. The bush may be of hollow cylindrical form or of hollow spherical form.

If desired each radical beam may be provided with a bush at each end to connect it to each of the relatively movable parts. Alternatively each radial beam may have one end rigidly secured to the movable part and may be sufficiently flexible to permit the vibration.

It will be appreciated that, when the moving part is vibrating at large amplitude, the effective length of the beam has to increase as the moving part moves away from its mean position. For example in the case of a beam 6 inches long a deflection of half an inch either way would require the effective length of the beam to increase by about twenty thousandths of an inch. This type of resilient coupling referred to imposes very little restriction on the movement along the axis of the vibrator since the inner member can turn relatively easily in relation to the outer member by shearing or torsional strain of the rubber bush. Relative movement between the inner and outer members by compression of the bush on one side and expansion on the other, occasioned by relative movement along the length of the beam, is much more restricted, but none the less is sufficient to provide for a slight degree of angularity of the order referred to above. Where the beam is connected to both of the relatively moving parts through resilient couplings the required movement in the latter direction is shared between the two couplings. In addition relative movement between the inner and outer members along the axis of the coupling is restricted, so that relative movement between the moving parts along a diameter will be resisted by the beams lying on a diameter at right angles to it.

Figure 2:
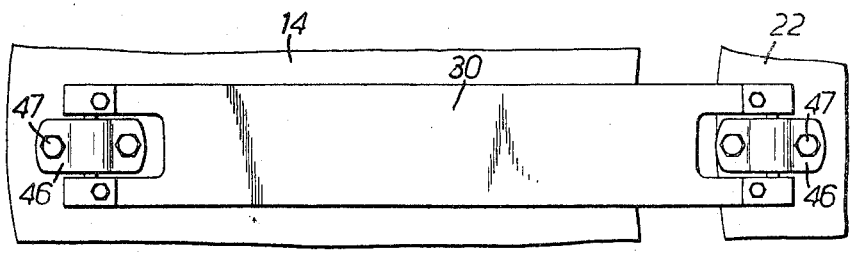
Figure 6:
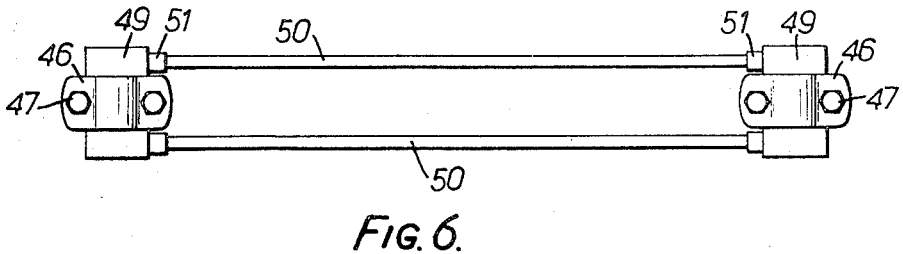
Figure 3:
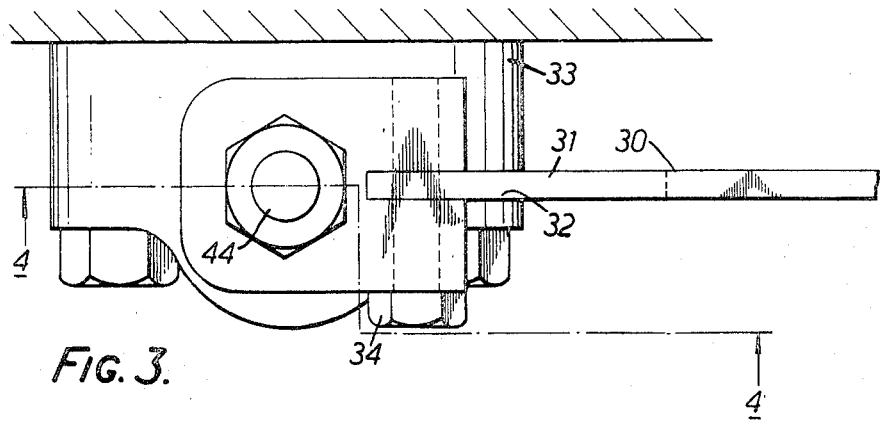
Figure 4:
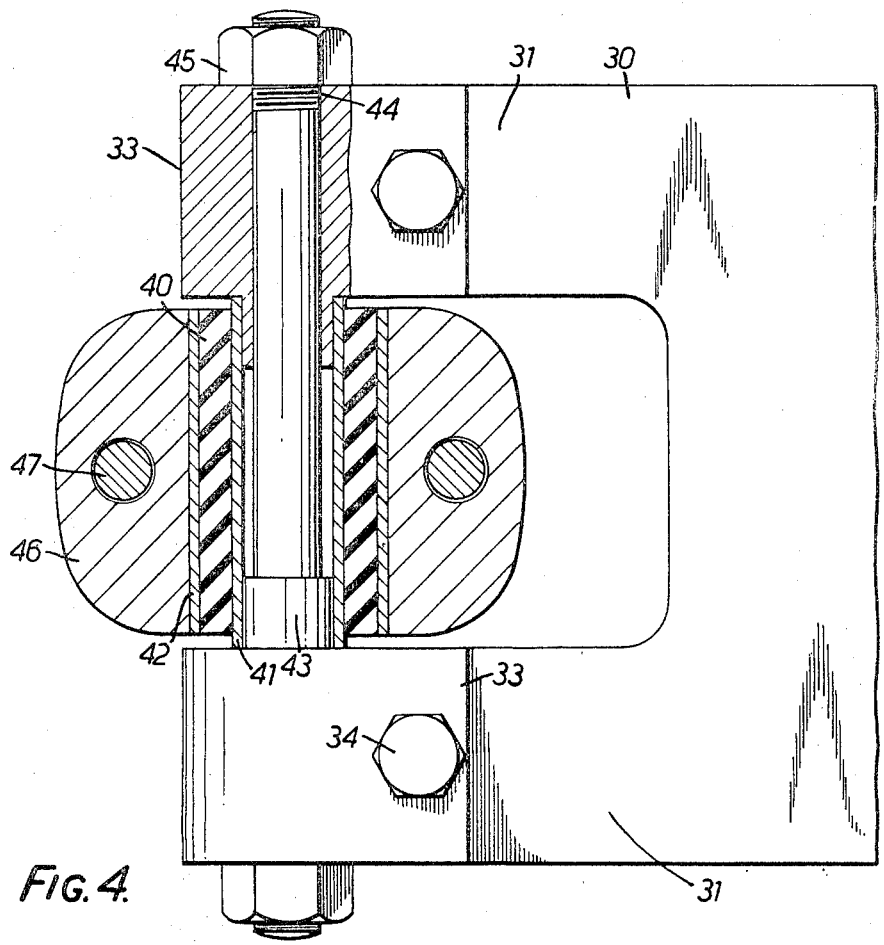
Figure 5:
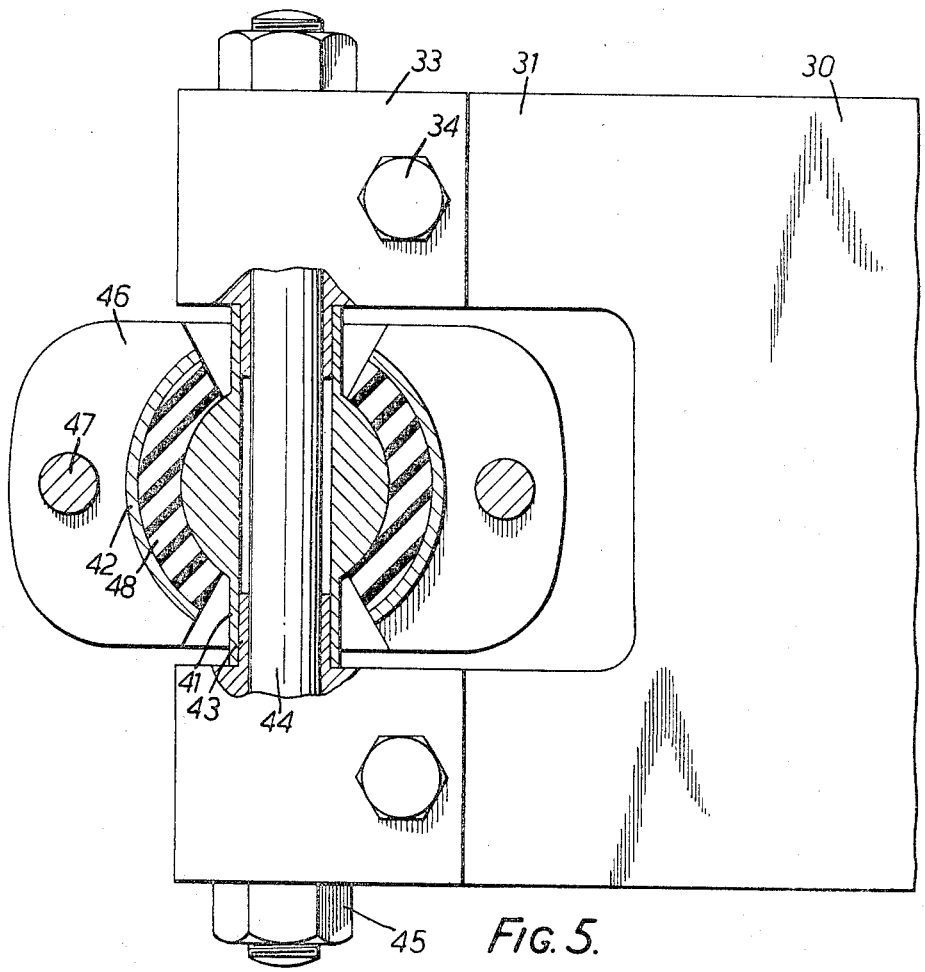
Figure 7:
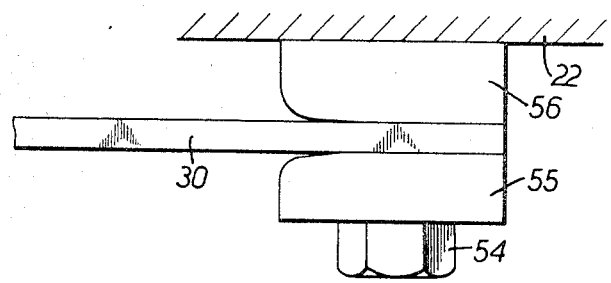
Figure 8:
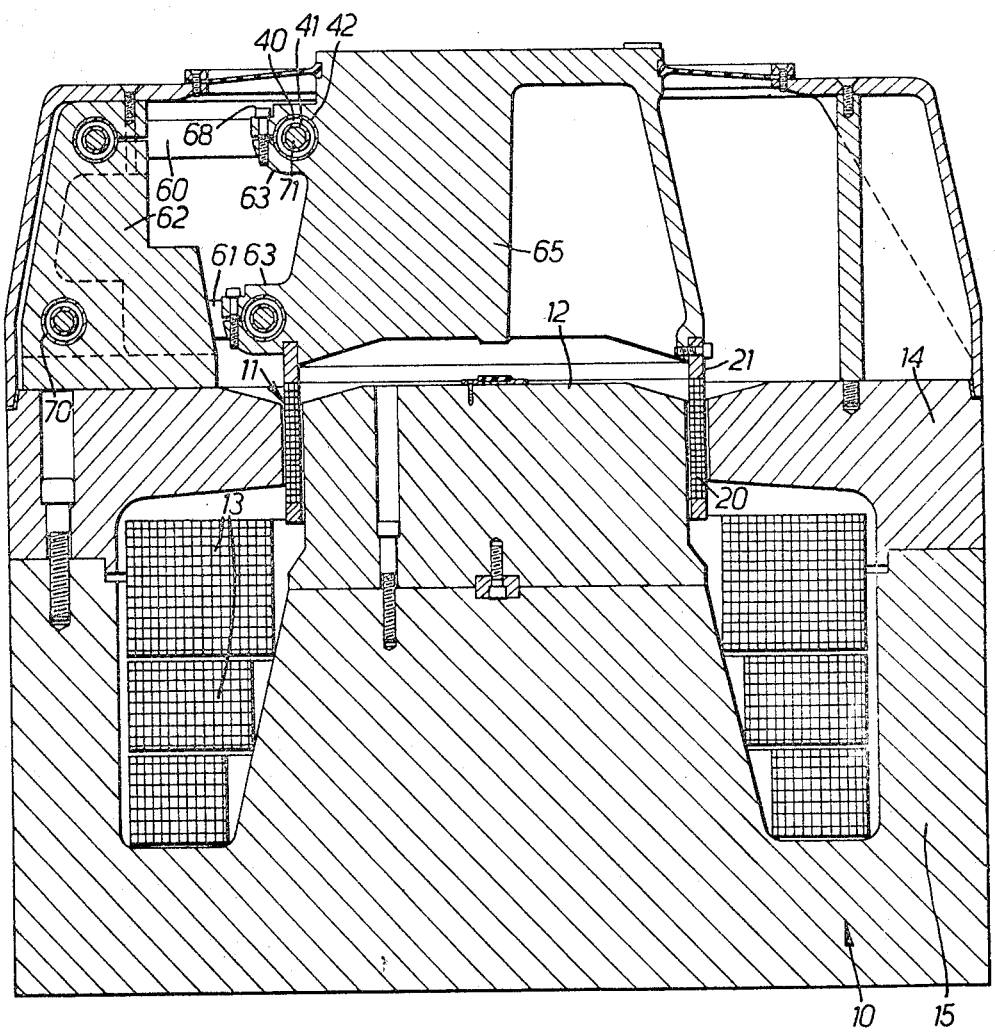
Figure 9:
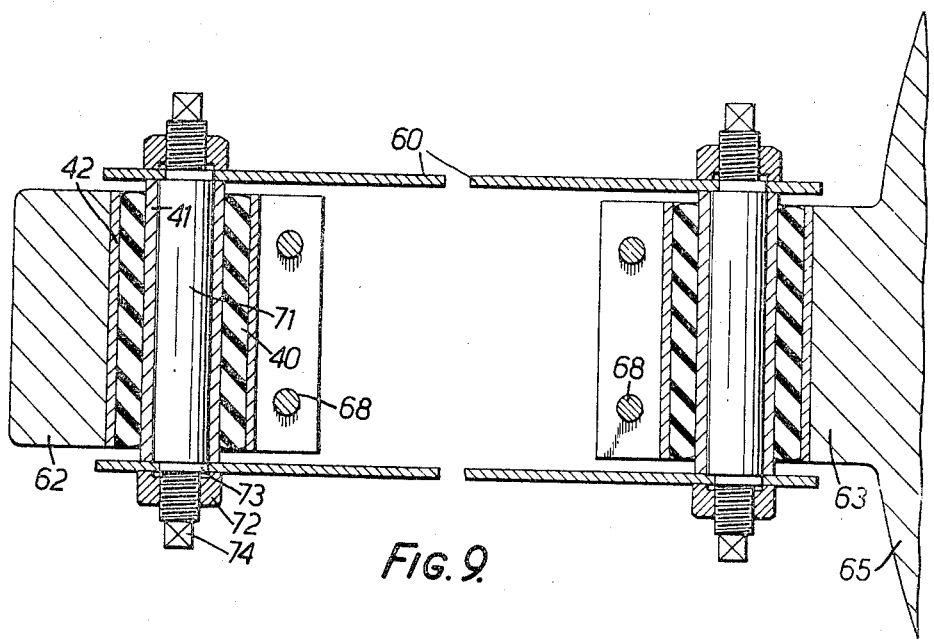
Figure 10:
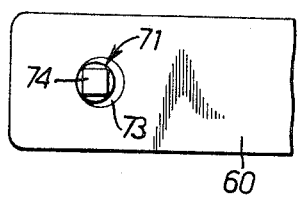

The invention may be put into practice in various ways but certain specific embodiments will be described by way of example with reference to the accompanying drawings in which:

FIG. 1 is a central sectional elevation of an electromagnetic vibrator embodying the invention, FIG. 2 is an enlarged under plan view of one of the beams, FIG. 3 is a further enlarged elevation similar to part of FIG. 1 showing a joint between one end of a beam and one of the relatively moving parts, FIG. 4 is a sectional bottom plan view on the line 4—4 of FIG. 3, FIG. 5 is a view similar to FIG. 4 of a modified form of coupling incorporating a part-spherical bush, FIG. 6 is a view similar to FIG. 2 of a beam formed of two bolts, FIG. 7 is a view of rigidly clamped end of a beam, FIG. 8 is a sectional elevation similar to FIG. 1 of a modified arrangement, FIG. 9 is a sectional plan view of a beam of FIG. 8, and FIG. 10 is a detailed elevation of the end of a bolt with the nut removed showing the eccentric adjusting arrangement.

As shown in FIG. 1 the invention is embodied in an electro-magnetic vibrator comprising a pot magnet 10 affording an annular air gap 11 between an inner pole piece 12, the lower part of which is surrounded by a D.C. exciting coil 13, and an annular pole ring 14 forming the upper part of an outer pole piece 15. A moving coil 20, provided with means for electrically connecting it to an alternating supply, is carried by a tubular support 21 in the air gap and is mechanically connected to an output member 22 to which a load can be secured. In the particular arrangement shown the inner pole piece is slotted to receive stiffening webs 23 of the output member.

The output member and moving coil are supported so as to be capable of axial vibration together. For this purpose the usual arrangement comprises a pair of diaphragms one above and the other below the pole ring 14.

In accordance with the present invention the supporting means comprises a number of beams 30 extending radially from the vibration axis and each having at, each end, a resilient bush coupling. For example there may be eight beams above the pole ring 14 and eight below it. In the arrangement shown in FIG. 2 each beam has a coupling at each end, one connecting it to the pole ring 14 and the other connecting it to the moving coil support 21 or the output member 22.

The beams may take various forms. In the embodiment shown in FIG. 2 each beam 30 is built up from laminations of metal and of resin-bonded fibre so as to reduce resonance to a minimum. The bending stiffness of the beam should be such that overstrain of the material does not take place at the maximum excursion.

Each beam is provided with two couplings of which the outer members are rigidly connected respectively to the fixed structure, in this case the pole ring 14, and the output member 22. If preferred to converse arrangement may be employed with the beam secured to the outer member and the inner member secured to the fixed or moving part.

FIGS. 3 and 4 show one form of coupling in more detail. The end of the beam 30 is of forked form comprising a pair of limbs 31 extending on opposite sides of the coupling and each received in a slot 32 in one of a pair of blocks 33, in which it is secured by a bolt 34 passing through the block in a direction perpendicular to the plane of the slot.

The coupling comprises a tubular bush 40 of rubber or like resilient material radially compressed between and bonded to an inner metal sleeve 41 and an outer metal sleeve 42. Opposite ends of the inner sleeve receive tubular bosses 43 projecting integrally from the blocks 33, and a shaft 44 passes through the blocks, bosses and inner sleeves and is provided with nuts 45 to secure the inner sleeve 41 rigidly to the beam 30.

The outer sleeve 42 is secured in a plummer block 46 which is secured by bolts 47 to the pole ring 14. At the opposite end of the beam a corresponding plummer block is secured to the output member.

FIG. 5 shows a coupling similar to that of FIG. 4 but embodying a bush 48 of part-spherical form.

In a further arrangement shown in FIG. 6 the blocks 33 are replaced by blocks 49 and the beam comprises a pair of bolts 50 one screwed into each block and clamped by a nut 51. This arrangement enables beams or couplings to be readily replaced should it become necessary during the life of the vibrator.

The arrangement described, employing rigid beams each having a coupling at each end, is suitable for large vibrators.

For smaller vibrators, for thrusts of a few hundred lbs. or less, it may be of greater importance to minimize the mass of the moving parts, and in this case one end of each beam 30 may be rigidly connected to the output member as indicated in FIG. 7. For this purpose the beam may be clamped by bolts 54 between suitable jaws 55 and 56 shaped to relieve stress concentration at the point where the beam enters the clamp. The beam must be designed to provide the required resilience in the bending mode but should be rigid in other modes, and in particular incapable of appreciably extending in length. In addition the beam should be designed to execute the desired deflection without excessive fatigue.

FIGS. 8 to 10 relate to a further embodiment of the invention in which both sets of beams are mounted above the magnetic circuit, that is to say above the pole ring 14. This facilitates removal of the output member and moving coil and enables this to be done without disturbing the pole ring 14 or other parts of the magnetic circuit. In other respects the lower part of the vibrator is similar to that of FIG. 1 and similar parts bear the same reference numerals. In addition in the arrangement of FIGS. 8 to 10 each beam is in the form of a pair of flat bars or strips lying in planes perpendicular to the axes of the couplings, so as to have their maximum resistance to bending about axes parallel to those of the couplings, and is secured to the inner sleeves of the couplings while the outer sleeves are secured respectively to the output member and the fixed structure.

In the specific embodiment there are three upper beams 60 and three lower beams 61 but more may be provided if required, for example for a bigger vibrator. The outer ends of both beams are connected to a block 62 which is secured by a number of screws, not shown, to the pole ring 14. The inner ends of both the upper and lower beams are connected to lugs 63 formed integrally with the output member 65 from the lower edge of which the moving coil and its support project downwards. Alternatively the integral lugs 63 may be replaced by blocks bolted to the output member, while the blocks 62 may be bolted to or formed integrally with a surrounding casing.

As shown in FIG. 9 each coupling is similar to that shown in FIG. 4 comprising a resilient bush 40 with an inner sleeve 41 and an outer sleeve 42. The outer sleeve is received in a bore of the lug 63 at the inner end of the beam and a bore in the block 62 at the outer end. The bore communicates with a radial slit which is bridged by a pair of clamping screws 68 serving to clamp the outer sleeve. The arrangement of the lower beam is similar except that the outer sleeve of the coupling at its outer end is secured by a grub screw 70.

A bolt 71 extends freely through the inner sleeve and has threaded portions near its ends to receive nuts 72 by which the beams 60 can be firmly clamped against the ends of the inner sleeve 41 so that the latter will be rigidly connected to the beams. The portion 73 of the bolt lying within the beam is, however, eccentric with respect to the portion fitting into the sleeve, and the bolt is provided with a square end portion 74 projecting beyond the nut 72 to receive a spanner.

This arrangement enables the bolt to be turned so as to adjust the effective length of the beam before the nuts 72 are finally tightened to clamp the beam and inner sleeves in a rigid assembly.

The adjustment of the effective length of the beam can be effected independently of the angular adjustment of the beam in relation to the inner sleeve. Accordingly the latter adjustment can be relied upon to provide an adjustment of the null position of the moving coil and output member, due to the torsional stiffness of the couplings. Thus, for example the output member may be raised a short distance above its mean position and held by a stop while the nuts 72 are tightened, so that when the stop is removed the weight of the output member will return it to a desired mean position. Equally, of course, it can be adjusted to some other null position, for example to allow for an expected dead load.

In any of the constructions described the electrical conductors supplying current to the moving coil may conveniently be bound to one or more of the beams. This avoids possible damage to which long flexible conductors hanging freely are liable, due to whipping or resonant vibration when one end is subjected to very substantial alternating accelerations.

In the aranegments described with reference to FIGS. 1 to 6 in which the beams lie generally in planes parallel to the axes of the couplings, and especially in the arrangement described with reference to FIG. 7 in which the beam must be flexible since one end is clamped, it may be desirable to introduce damping in order to reduce flexing vibration or resonance of the beam itself. For example, as described, the beam may be formed from laminations of metal and a plastics material, such as a strip of aluminium alloy interposed between and bonded by an epoxy resin to a pair of strips of the fabric reinforced synthetic resin sold under the trade mark Tufnol. On the other hand in the arrangement described with reference to FIGS. 8 to 10, where the strips forming the beam are on edge in planes at right angles to the axes of the couplings, the problem of flexing vibration has been found to present little difficulty, presumably because the beams are extremely stiff in the direction in which the main vibration occurs.

The dimensions of the beams will, of course, depend on the size of the vibrator but by way of example, in the construction shown in FIG. 8, having a diameter of some two feet and capable of exerting a thrust of about 800 lbs., the arms are about six inches long each being formed of two flat bars of steel or aluminium alloy about one inch wide and ⅛ inch thick.

The vertical stiffness imposed by the torsional stiffness of the couplings is of the order of 600 lbs./inch.

A similar construction is, however, suitable for much bigger vibrators, capable of thrusts of 50,000 lbs. or more and consuming tens or even hundreds of kilowatts.

It will be appreciated that the invention is not limited to the constructions specifically described which may be combined and modified in many ways. The couplings may take various forms; in particular the separate sleeves may be omitted, the bush being directly pressed into the annular space between the two members to be connected.

What I claim as my invention and desire to secure by Letters Patent is:

1. In an electro-mechanical vibrator of the moving coil type having a fixed member forming an annular air gap and movable members including the moving coil mounted in the air gap for vibrating only along a given axis and constrained against other modes of movement and an output support member mounted to the moving coil, means for mounting the movable members to the fixed member, comprising:
   a number of rigid beam members symmetrically distributed completely around and extending radially from the vibration axis,
   coupling means for mounting each beam member to the movable members and to the fixed member, each of said coupling means is mounted to rotate about an axis of rotation substantially perpendicular to said vibration axis and to the longitudinal axis of its respective beam member, and each of said coupling means is resilient to allow relative movement about its rotation axis and an effective elongation of its respective beam member thereby preventing arcuate movement of said moving coil and enabling said movable members to vibrate only along said given vibration axis.

2. Apparatus as in claim 1 wherein each of said coupling means includes a fixed shaft mounted along said rotation axis, a rigid inner support member adjacent said shaft, a rigid outer support member mounted in spaced relation to said inner support member, and a bush of resilient material in the form of a surface of revolution about said rotation axis and mounted in radial compression between and retained by said inner and outer support members.

3. Apparatus as in claim 2 wherein each of said coupling means further includes spaced boss members interposed between said shaft and said inner support member.

4. Apparatus as in claim 2 wherein said inner and outer support members of each of said coupling means is adjustable about said rotation axis relative to one another thereby permitting the null position of said movable members to be adjusted due to the alteration of the torsional stiffness of the coupling.

5. Apparatus as in claim 1 wherein each of said rigid beam members is mounted by said coupling means to provide maximum resistance to bending about the respective rotation axes.

6. Apparatus as in claim 5 wherein each of said rigid beam members consists of a pair of bars mounted substantially perpendicular to said rotation axis to opposite ends of said coupling means.

7. Apparatus as in claim 6 wherein said pair of bars abut securely against the ends of the respective inner support member.

8. Apparatus as in claim 6 further comprising means for adjusting the effective length of a beam.

9. Apparatus as in claim 8 wherein said means for adjusting includes means for receiving said shaft in each of said bars in eccentric relationship to the mounting of said shaft with respect to said inner support member so that rotation of said means for receiving adjusts the effective length of the beam.

10. Apparatus as in claim 1 wherein the output support member is mounted in vertical spaced relationship to the fixed member and the moving coil along the vibration axis and said rigid beam members and said coupling means are mounted above said fixed member.

References Cited

UNITED STATES PATENTS

| | | | |
|---|---|---|---|
| 2,844,399 | 7/1958 | Bonmartini | 287—85 |
| 2,846,598 | 8/1958 | Zerigian | 310—27 |
| 2,048,256 | 7/1936 | Geyer | 287—85 |
| 1,948,452 | 2/1934 | Young | 310—29 |
| 3,038,743 | 6/1962 | Zaloumis | 287—85 XR |
| 2,481,131 | 9/1949 | Lindsey | 310—29 XR |
| 2,890,438 | 6/1959 | Bardeen | 310—15 XR |
| 2,753,225 | 7/1956 | Gilmer | 287—85 XR |
| 3,234,782 | 2/1966 | Grootenhuis | 310—27 XR |
| 2,336,930 | 12/1943 | Dyer. | |
| 2,734,138 | 2/1956 | Orarec | 310—27 |
| 2,933,715 | 4/1960 | Beuermann | 310—27 XR |
| 3,479,542 | 11/1969 | Makino | 310—81 |

FOREIGN PATENTS

| | | |
|---|---|---|
| 1,185,630 | 8/1959 | France. |

WARREN E. RAY, Primary Examiner

B. A. REYNOLDS, Assistant Examiner

U.S. Cl. X.R.

73—71; 310—29